Oct. 9, 1951     R. A. E. HIGONNET     2,570,235
DEVICE FOR MEASUREMENT OF THE DISTANCES OF OBSTACLES
Filed June 1, 1946     2 Sheets-Sheet 1

INVENTOR.
RENE A. E. HIGONNET
BY
ATTORNEY

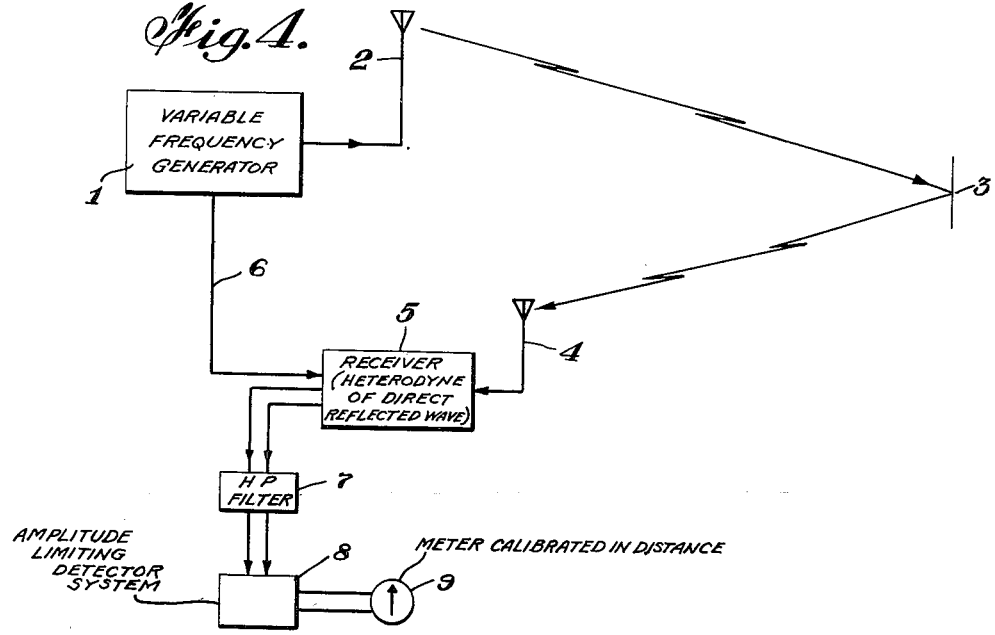
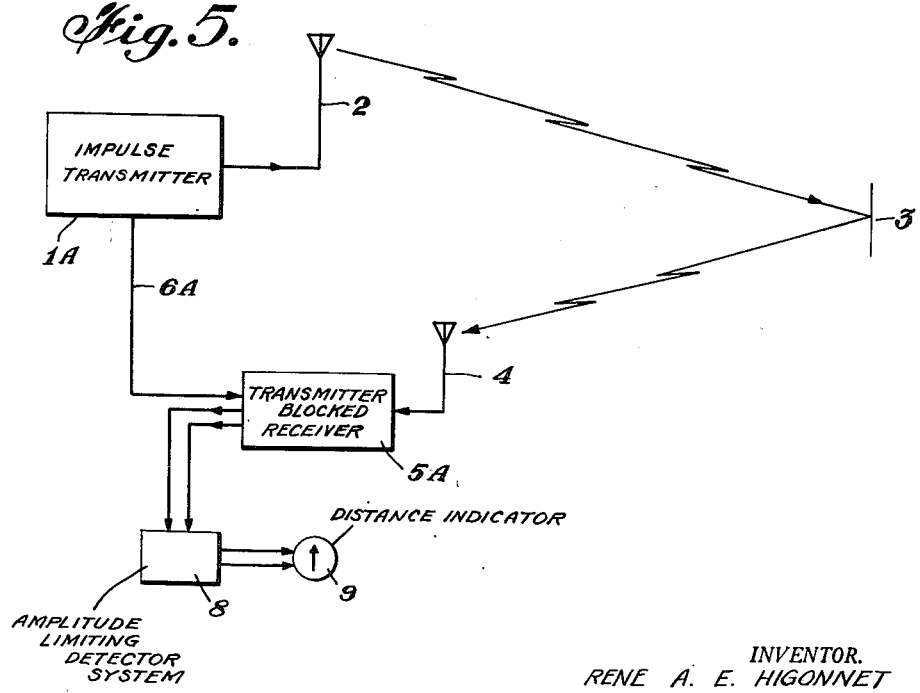

Patented Oct. 9, 1951

2,570,235

UNITED STATES PATENT OFFICE 2,570,235

DEVICE FOR MEASUREMENT OF THE DISTANCES OF OBSTACLES

René A. E. Higonnet, Saint-Cloud, France, assignor to International Standard Electric Corporation, New York, N. Y., a corporation of Delaware Application June 1, 1946, Serial No. 673,769
In France April 12, 1940

Section 1, Public Law 690, August 8, 1946
Patent expires April 12, 1960

4 Claims. (Cl. 343—14)

1

The present invention relates to devices for the measurement of the distances, or the position finding, of obstacles, by means of radio electric waves.

In measurement methods of prior knowledge, very short-time impulses are sent out and the distance is deducted from the measurement of the both-way travel time of waves reflected from an obstacle. There are also prior known methods in which a wave of continuously variable frequency is heterodyned with waves reflected by the obstacle, and the distance is deduced from the measurement of the beat frequency.

For obtaining a direct reading, these methods require measurements of the time or frequency that are relatively complicated.

One of the main objects of the invention is that of providing for the measurement of the distances of obstacles, or their detection, devices in which it is easy to obtain direct readings, e. g. on a milliammeter which can be graduated for distance.

According to characteristic features of the invention, use is made of impulses of fixed frequency, or else an emission of continuously variable frequency that is combined with the received echoes so as to produce beats whose duration is a function of the distance to be measured. The measurement can accordingly be reduced to a measurement of the duration of the beats, i. e. to a simple measurement of a pulsating current of constant amplitude and of a duration equal to that of the beats.

The invention can be understood better by referring to the following description and the respective drawings, in which:

Fig. 4 is a simple block circuit diagram of one embodiment of my invention; and

Fig. 5 is a block circuit diagram illustrating an alternative embodiment thereof.

Figure 1:
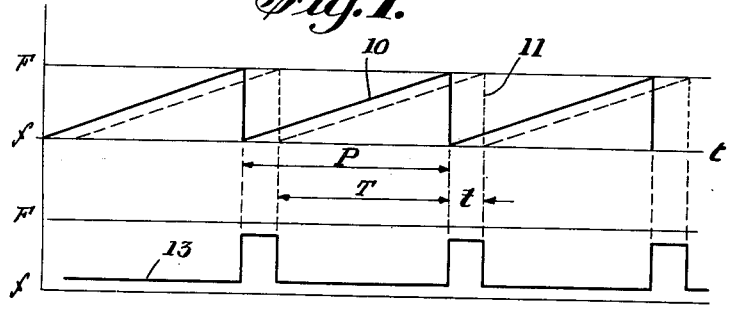
Fig. 1 is a wave form diagram covering variable frequency emissions.

Referring to Fig. 1, it is assumed that there is sent out a continuously variable frequency wave 10, varying between two values $f$ and $F$.

2

When the frequency has attained the value F, the cycle begins again and the frequency is brought back to the value $f$. It is assumed for the present that this transition occurs instantaneously.

The dotted line curve 11 shows the wave reflected from an obstacle; this reflected wave has a lag of time "$t$" with respect to the emitted wave shown by the heavy line.

The lower curve 13 of Fig. 1 shows the difference in frequencies, i. e. what is obtained after heterodyning of the emitted wave by the reflected wave.

There will first be observed a frequency of the value $$\frac{t}{P}(F-f)$$

having a duration T that differs little from the period P of the frequency scanning' It is this beat frequency whose value is measured with a frequency meter according to the previously mentioned methods. Besides this frequency, which has a value varying between O and $$\frac{to}{P}(F-f)$$

$to$ being the both-way travel time of the waves to and from the obstacle (this travel time is as a rule a slight fraction of the scanning period P), there is obtained a frequency $\psi$ of a value complementary to F $$\phi = F - f\frac{t}{P}(F-f) = (F-f)\left(1-\frac{t}{P}\right)$$

i. e. very close to the maximum value of the scanning and having a duration $t$.

These impulses are of a frequency easy to isolate, since their value varies very considerably from the other products of heterodyning, and have accordingly a duration that is precisely equal to that of the both-way travel time of the electromagnetic waves. In other words the frequency will have limits between $F-f$ and O and a duration from O to P as limits, although as a rule only those values close to $F-f$ and O, respectively, will actually be used.

The invention turns this observation to account by providing in particular for the transformation by detection of these impulses of frequency into pulsating current of constant amplitude by means of a limiting detector system; in this way there is obtained a pulsating current having a mean value that is precisely a direct measurement of the both-way time of travel of the waves to and from their starting point and the obstacle. It is accordingly possible a priori to graduate for distance a milliammeter inserted in this circuit.

In practice it is not possible to bring the frequency instantaneously from the value F to the value $f$ as shown in Fig. 1.

Figure 2:
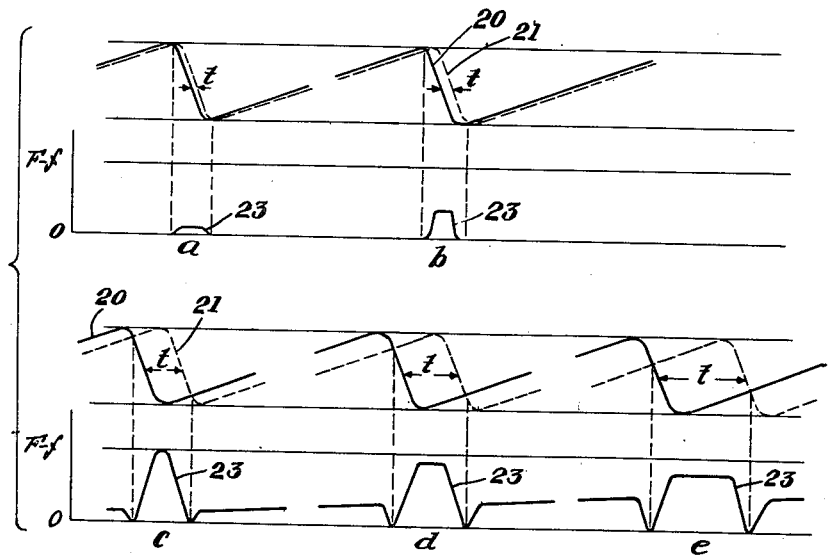
Fig. 2 illustrates a wave form variation of Fig. 1.

Fig. 2 illustrates in curves 20, 21 and 23 the frequency variation as it can be obtained in practice, but with exaggeration of the duration of the return to frequency $f$.

In this case it can be seen that, when the duration of the lag $t$ of the reflected wave increases from zero onward, the impulses assume the successive shapes shown at $a$, $b$, $c$, $d$, $e$.

For a slight lag, the frequency is not equal to $F-f$, as would be the case if the return of the frequency from F to $f$ took place instantaneously.

This intermediate period is, of course, all the shorter as the change of frequency is made more rapid, and it limits the precision of the measurements for very short distances. A similar occurrence takes place in the method of measurement by sending out impulses having a wave front steepness that limits the precision.

It will be observed that the indicated method of distance measurement may be used simultaneously with the known method of measurement of the beat frequency that extends over the time interval T (Fig. 1).

Figure 3:
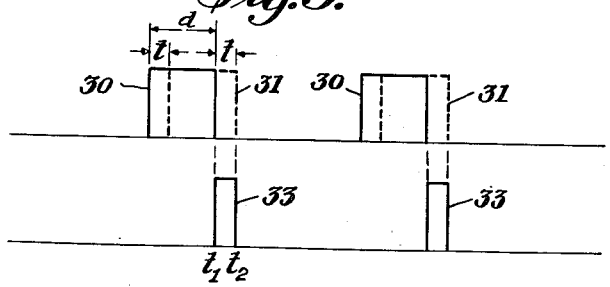
Fig. 3 is a wave form diagram covering an adaptation of my invention for emission of regularly spaced impulses.

Fig. 3 shows adaptation of the invention to an impulse sending method.

The impulses 30 are sent out in as rectangular a shape as possible and they are shown in heavy lines in the drawing.

The duration of these impulses "$d$" is greater than the maximum arrival time of the echoes proceeding from the most distant objects. The reflected impulses 31 shown in dotted lines that arrive with a lag $t$ are shifted precisely by this lag "$t$." Accordingly, if the receiver is blocked at the time of the emission, it will only be in a position to amplify the reflected impulses after termination of the emission, i. e. at the moment $t_1$, as shown by impulses 33, and the thus reduced duration of the reflected impulses will be exactly equal to the two-way travel time of the waves to and from the obstacle.

In order to insure the lapping, it is sufficient to give the impulses a duration longer than the duration of the two-way travel time of the waves. Furthermore, this duration may be of any length and the precision of the measurments is not affected by a variation in the duration of these impulses or by a change in the distribution in time of these impulses as long as their number remains constant per unit of time. This condition is not necessary if, for example, observation of the reflected impulses is made on a cathode ray oscillograph that is synchronized with the emission.

The amplitude of these waves can be fixed at a quite definite value by a limiting device, and as, explained above, they can serve for determining the distance by direct reading. For this, it is sufficient to send them after detection to a milliammeter, for example.

Turning to Fig. 4, a diagrammatic illustration of a system embodying the features of my invention is disclosed. The variable frequency generator 1, serves to produce the variable frequency waves as illustrated in Figs. 1 and 2. The period of these waves is generally greater than the time taken for the energy to travel from radiating antenna 2 to reflecting object 3 and back to receiving antenna 4. Energy from antenna 4 is beat with energy fed directly from generator 1 over line 6 to produce beat frequency components. A high pass filter 7, permits the high frequency energy corresponding to period $t$ of Figs. 1 and 2, to pass to an amplitude limiting detector system 8. The output from detector 8 is supplied to a suitable indicator 9, preferably calibrated in distance units. Because of the selective action of filter 7, the duration of the impulses supplied to detector 8 will correspond substantially with the two-way travel time of the impulse. Thus, a direct indication of distance will be produced.

In Fig. 5 is illustrated a system using a fixed carrier frequency, as illustrated in Fig. 3. In this arrangement the transmitter 1A is keyed to produce current impulses of greater duration than the two-way travel time of the impulse energy. These impulses are transmitted from antenna 2 to reflecting object 3 and hence to antenna 4, and to receiver 5A. Receiver 5A is blocked by energy from transmitter 1A supplied over line 6A during the transmitting periods. Thus, only energy received during period $t$ (Fig. 3) will appear at the output of the receiver. This period also is substantially equal to the two-way travel time of the energy to the reflecting object. This output energy is applied to an amplitude limiting detector system 8 and after detection to distance indicator 9.

It is evident that the impulses obtained by the means proposed in the invention may be utilized for measurements by other methods than that of measurement of the mean current which is cited as an example, e. g. by use of cathode ray oscillographs, etc.

I claim:

1. A distance determining system comprising means for transmitting frequency modulated radio waves having successive relatively abrupt changes in frequency rate between relatively gradual changes in frequency rate, means adjacent to the transmitter for receiving said waves directly from said transmitting means and also after a delay by reflection from an object, means for heterodyning the directly received waves and the reflected waves to produce a resultant pulse wave in which the pulse energy varies in accordance with variations in the interval between the direct reception of waves changing abruptly in frequency and reflected reception of the same waves, and means for measuring the energy of said pulse wave and thereby determining the distance from the transmitting and receiving means to said object.

2. A system as set forth in claim 1, including a wave source and means for frequency modulating waves from said source in successive stages each including a steady and relatively gradual change of frequency in one direction followed by a relatively abrupt change of frequency in the other direction, producing a sawtooth modulation pattern.

3. A system as set forth in claim 1, in which the measuring means includes high pass filter means for passing only said pulse waves, and means for thereafter measuring the energy of said pulse waves.

4. A system as set forth in claim 1, in which the measuring means includes high pass filter means for passing only said pulse waves, and means for thereafter measuring the energy of said pulse waves, said measuring means including a rectifier for the said pulse waves and a meter responsive to the rectifier output.

RENÉ A. E. HIGONNET.

REFERENCES CITED

The following references are of record in the file of this patent:

UNITED STATES PATENTS

| Number | Name | Date |
|---|---|---|
| 1,585,591 | Lowy | May 18, 1926 |
| 2,206,896 | Higgins | July 9, 1940 |
| 2,280,109 | Varela | Apr. 21, 1942 |
| 2,404,527 | Potapenko | July 23, 1946 |
| 2,467,455 | Aurell | Apr. 19, 1949 |
| 2,512,330 | Hendrick | June 20, 1950 |

FOREIGN PATENTS

| Number | Country | Date |
|---|---|---|
| 114,579 | Sweden | July 24, 1945 |